(12) United States Patent
Hamada et al.

(10) Patent No.: US 6,367,837 B1
(45) Date of Patent: Apr. 9, 2002

(54) SEATED-STATE DETECTION SENSOR AND PASSENGER SEAT AIR BAG DEVICE CONTROL SYSTEM EMPLOYING THE SEATED-STATE DETECTION SENSOR

(75) Inventors: Makoto Hamada, Toyota; Hiroshi Uenaka, Okazaki; Seiji Yamashita, Susono; Osamu Fujimoto, Nisshin, all of (JP)

(73) Assignee: Toyota Jidosha Kabushiki Kaisha (JP)

( * ) Notice: Subject to any disclaimer, the term of this patent is extended or adjusted under 35 U.S.C. 154(b) by 0 days.

(21) Appl. No.: 09/528,193

(22) Filed: Mar. 17, 2000

(30) Foreign Application Priority Data

Mar. 18, 1999 (JP) ............................................. 11-073358

(51) Int. Cl.7 .............................................. B60R 21/32
(52) U.S. Cl. ...................... 280/735; 280/734; 280/730.1
(58) Field of Search .............................. 280/735, 734, 280/730.1, 732, 728.1; 180/273

(56) References Cited

U.S. PATENT DOCUMENTS

| 5,118,134 A | * | 6/1992 | Mattes et al. ............... 280/735 |
| 5,330,226 A | | 7/1994 | Gentry et al. |
| 5,468,013 A | * | 11/1995 | Gille ........................... 280/24 |
| 5,474,327 A | * | 12/1995 | Schousek .................... 280/735 |
| 5,612,876 A | | 3/1997 | Zeidler et al. |
| 5,624,132 A | * | 4/1997 | Blackburn et al. .......... 280/735 |
| 5,739,757 A | | 4/1998 | Gioutsos |
| 5,810,392 A | | 9/1998 | Gagnon |
| 5,821,633 A | | 10/1998 | Burke et al. |
| 5,868,423 A | | 2/1999 | Takimoto et al. |
| 6,012,007 A | * | 1/2000 | Fortune et al. ................ 701/45 |
| 6,109,117 A | * | 8/2000 | Stanley et al. ......... 73/862.325 |

FOREIGN PATENT DOCUMENTS

| EP | 0650869 A1 | * | 3/1995 | ........... B60R/21/00 |
| JP | 06107114 A | | 4/1994 | |
| JP | 7-112802 | | 12/1995 | |
| JP | 10039045 | | 2/1998 | |

* cited by examiner

Primary Examiner—Lanna Mai
Assistant Examiner—Christopher Buchanan
(74) Attorney, Agent, or Firm—Pillsbury Winthrop LLP

(57) ABSTRACT

A seated-state detection sensor is disposed in a seat portion of a seat cushion of a passenger seat. The seated-state detection sensor is divided into three parts, that is, a first seated-state detection sensor, a second seated-state detection sensor and a third seated-state detection sensor, which are arranged in this order from the rear side of the vehicle. The first seated-state detection sensor and the second seated-state detection sensor are designed to determine whether or not there is a passenger seated. The second seated-state detection sensor and the third seated-state detection sensor are designed to detect forward displacement of the passenger.

16 Claims, 6 Drawing Sheets

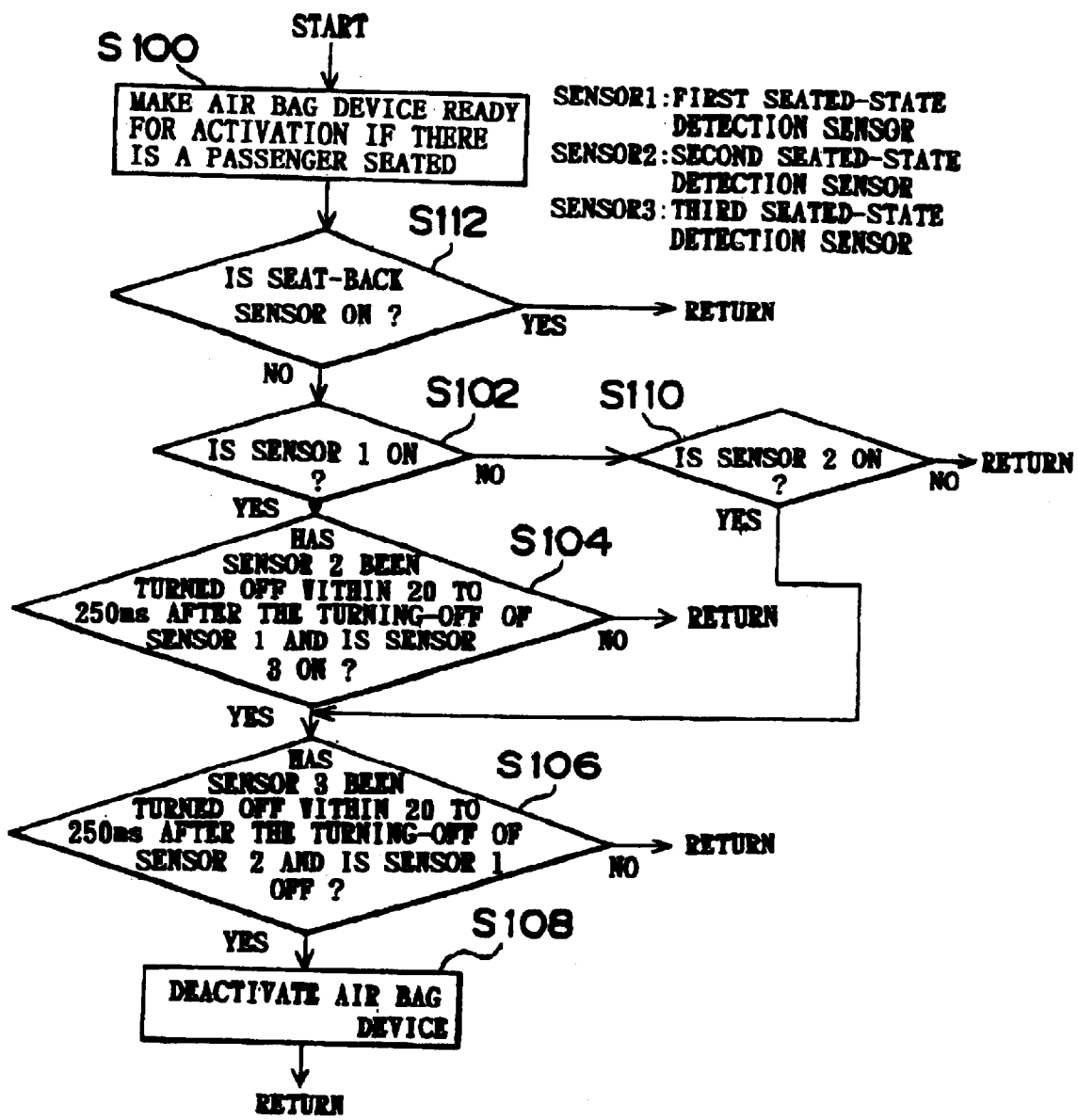

SEATED-STATE DETECTION SENSOR AND PASSENGER SEAT AIR BAG DEVICE CONTROL SYSTEM EMPLOYING THE SEATED-STATE DETECTION SENSOR

INCORPORATION BY REFERENCE

The disclosure of Japanese Patent Application No. HEI 11-73358 filed on Mar. 18, 1999 including the specification, drawings and abstract is incorporated herein by reference in its entirety.

BACKGROUND OF THE INVENTION

1. Field of the Invention

The present invention relates to a seated-state detection sensor and a passenger seat air bag device control system employing the seated-state detection sensor. In particular, the present invention relates to a seated-state detection sensor for controlling activation of a passenger seat air bag device installed in a vehicle such as an automobile, and a passenger seat air bag device control system employing the seated-state detection sensor.

2. Description of the Related Art

An example of a previously employed control apparatus for controlling activation of an air bag device installed in a vehicle such as an automobile is disclosed in Japanese Patent Application Laid-Open No. HEI 6-107114.

In the apparatus disclosed in Japanese Patent Application Laid-Open No. HEI 6-107114, an ultrasonic sensor designed as a distance sensor attached to an instrument panel is used to measure a distance from a passenger, and relative speed detection means is used to measure a relative speed between a vehicle and the passenger. A relative speed between the vehicle and the passenger at the time when the passenger contacts a steering wheel after collision is calculated based on the measured distance and relative speed. The air bag device is activated if the calculated relative speed exceeds a threshold value.

It is considered to control activation of a passenger seat air bag device by using a distance sensor similar to that disclosed in Japanese Patent Application Laid-Open No. HEI 6-107114 to measure a distance between the sensor and a passenger seated in a passenger seat. In this case, however, since the passenger seated in the passenger seat does not grasp a steering wheel which is grasped by a passenger seated in a driver seat, the passenger seated in the passenger seat can freely move his or her hands. Consequently the distance sensor may detect the hands of the passenger seated in the passenger seat. For this reason such a distance sensor has difficulty in precisely detecting forward bodily displacement of the passenger seated in the passenger seat.

SUMMARY OF THE INVENTION

It is an object of the present invention to obtain a seated-state detection sensor which is capable of precisely detecting forward bodily displacement of a passenger without being affected by movements of his or her hands, and a passenger seat air bag device control system employing the seated-state detection sensor.

In a first aspect of the present invention, a seated state detection sensor disposed in a seat cushion and divided into a plurality of parts in a longitudinal direction of a vehicle includes a seated-state detecting portion for detecting whether or not there is a passenger seated and a displacement detecting portion for detecting forward displacement of the passenger.

Thus, the presence or absence of a seated passenger can be detected by the seated-state detecting portion of the seated-state detection sensor, and forward displacement of the seated passenger can be detected by the displacement detecting portion of the seated-state detection sensor. As a result, it is possible to precisely detect forward bodily displacement of the passenger without being affected by movements of his or her hands.

In a second aspect of the present invention, a passenger seat air bag device control system includes a seated-state detection sensor disposed in a seat cushion and divided into a plurality of parts in a longitudinal direction of a vehicle. The seated-state detection sensor includes a seated-state detecting portion for detecting whether or not there is a passenger seated and a displacement detecting portion for detecting forward displacement of the passenger. The passenger seat air bag device is controlled based on a detection signal of the seated-state detection sensor.

Thus, the presence or absence of a seated passenger can be detected by the seated-state detecting portion of the seated-state detection sensor. Also, when the passenger is displaced forwardly at the time of braking as a precaution against collision, the forward displacement of the passenger can be detected by the displacement detecting portion. As a result, it is possible to precisely detect forward bodily displacement of the passenger without being affected by movements of his or her hands. Therefore, activation of the passenger seat air bag device can suitably be controlled.

In the first and second aspects, the seated-state detecting portion may be a rear portion of a plurality of divided parts of the seated-state detection sensor, and the displacement detecting portion may be a front portion of a plurality of divided parts of the seated-state detection sensor.

In the second aspect, on-to-off transition timing in the rear and front portions of the seated-state detection sensor may be measured. In this case, if an interval between the measured timings is in a predetermined time range, it is judged that the passenger has been displaced forwardly. Then activation or deactivation of the air bag device or an output level of an inflater may be controlled.

In this construction, the passenger seated in the passenger seat is displaced forwardly at the time of braking as a precaution against collision. On-to-off transition timings in the rear and front portions of the seated-state detection sensor are measured in response to the forward displacement of the passenger. If the interval between the measured timings is in a predetermined time range, it is judged that the passenger has been displaced forwardly, and activation or deactivation of the air bag device or an output level of an inflator is controlled. As a result, it is possible to precisely detect forward bodily displacement of the passenger without being affected by movements of his or her hands. Therefore, activation of the passenger seat air bag device can suitably be controlled. Further, since forward displacement of the passenger is judged based on two pieces of information obtained from the rear and front portions of the seated-state detection sensor, it is possible to avoid misjudgment and optimally control the air bag device.

In the second aspect, an interval between on-to-off transition timings of a first seated-state detection sensor constituting a rear portion of the seated-state detection sensor and a second seated-state detection sensor constituting an intermediate portion of the seated-state detection sensor and an interval between on-to-off transition timings of the second seated-state detection sensor and a third seated-state detection sensor constituting a front portion of the seated-state detection sensor may be measured. In this case, only if both the transition periods are in a predetermined time range, the air bag device is controlled to be deactivated.

In this construction, only if both the interval between the on-to-off transition timings of the first seated-state detection sensor and the second seated-state detection sensor and the interval between the on-to-off transition timings of the second seated-state detection sensor and the third seated-state detection sensor are in the predetermined time range, the air bag device is controlled to be deactivated. This, it is possible to precisely detect forward bodily displacement of the passenger and optimally control the air bag device.

In the second aspect, when the first seated-state detection sensor constituting the rear portion of the seated-state detection sensor is off and the second seated-state detection sensor constituting the intermediate portion of the seated-state detection sensor is on, it may be predicated that the passenger has been seated in a front side of a vehicle seat from the very outset. In this case, an interval between on-to-off transition timings of the second seated-state detection sensor and a third seated-state detection sensor constituting a front portion of the seated-state detection sensor is measured, and it is determined whether or not the measured interval is within a predetermined length of time. Then, the air bag device may be controlled to be deactivated.

In this construction, even if the passenger has been seated in the front portion of the seat cushion from the very outset, the interval between the on-to-off transition timings of the second seated-state detection sensor and the third seated-state detection sensor is measured, and it is determined whether or not the measured period is within a predetermined length of time, and then the air bag device is controlled to be deactivated. Therefore, it is possible to detect forward bodily displacement of the passenger with certainty and suitably control the air bag device.

In the second aspect, the rear portion of the seated-state detection sensor may set an on-signal duration period which is at least more than twice as long as an off-to-on time lag. In this case, if at least one on-signal is detected within the on-signal duration period, it is determined that there is a passenger seated.

In this construction, it is possible to prevent erroneous detection from being caused when the seated-state detection sensor is switched from on to off due to a slight bodily displacement of a passenger, for example, in the case where the vehicle travels along a rough road, or from being caused by electric noise.

In the second aspect, a detecting portion of the second seated-state detection sensor can be set to a position at a distance of 150 mm to 300 mm from a front end of the seat cushion.

In this construction, even when a child passenger is seated in the front portion of the seat cushion with his or her knees flexed, this state can be detected. Consequently, even in this case, the air bag device can be deactivated.

In a third aspect of the present invention, a seated-state detection sensor which is disposed in a seat cushion and detects whether or not there is a passenger seated includes a displacement detecting portion which is divided into a plurality of parts in a longitudinal direction of a vehicle and detects forward displacement of the passenger.

In a fourth aspect of the present invention, a passenger seat air bag device control system includes a seated-state detection sensor which is disposed in a seat cushion and detects whether or not there is a passenger seated. The seated-state detection sensor includes a displacement detecting portion which is divided into a plurality of parts in a longitudinal direction of a vehicle and detects forward displacement of the passenger. The passenger seat air bag device is controlled based on a detection signal from the seated-state detection sensor.

BRIEF DESCRIPTION OF THE DRAWINGS

The foregoing and further objects, features and advantages of the present invention will become apparent from the following description of preferred embodiments with reference to the accompanying drawings, wherein:

FIG. 6 is a flowchart of the control system for the passenger seat air bag device employing the seated-state detection sensor in accordance with a modification example of one embodiment of the present invention.

DETAILED DESCRIPTION OF PREFERRED EMBODIMENTS

Figure 1:
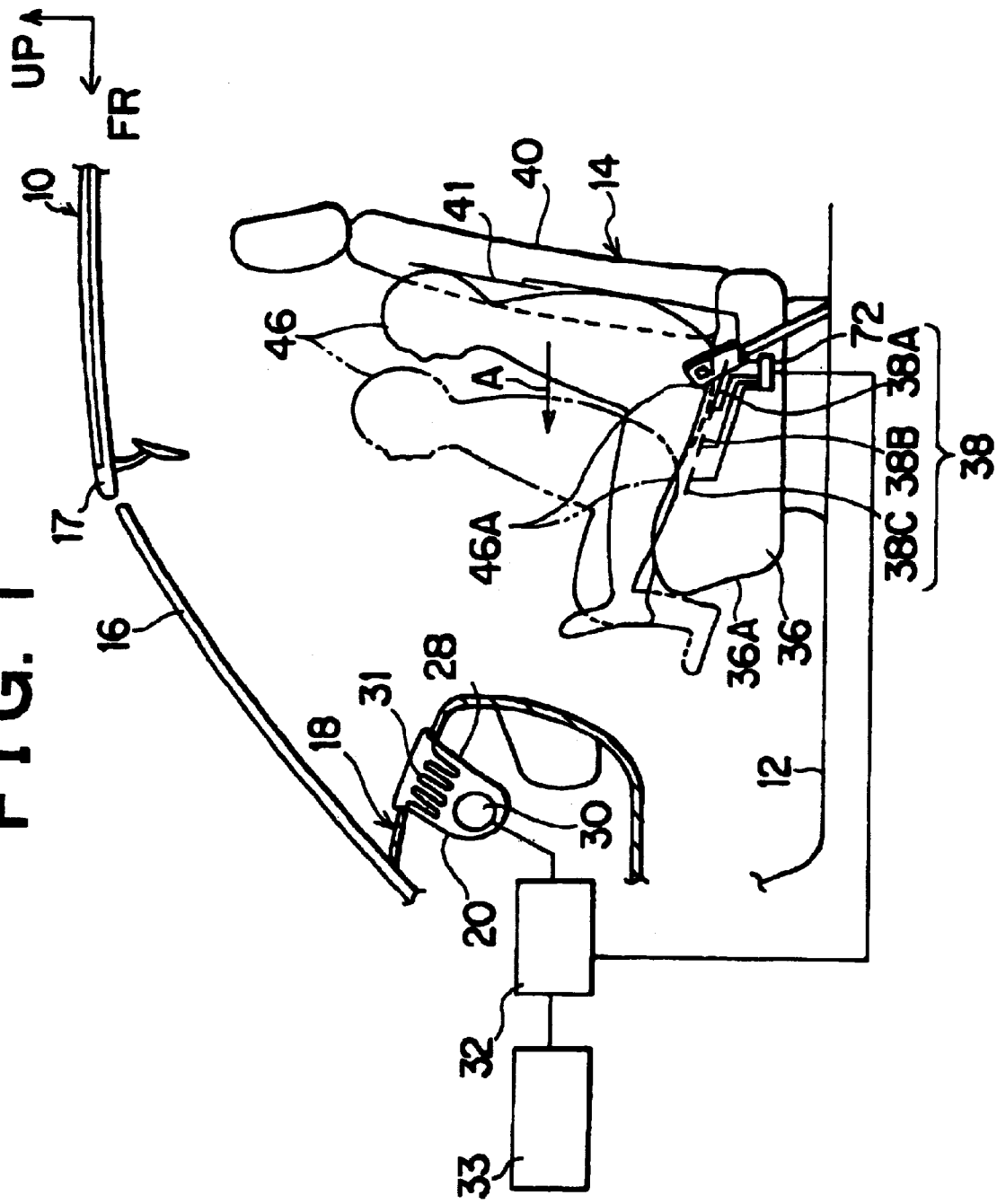
FIG. 1 is a schematic side sectional view of a control system for a passenger seat air bag device employing a seated-state detection sensor in accordance with one embodiment of the prevent invention.

A seated-state detection sensor and a control system for a passenger seat air bag device employing the seated-state detection sensor in accordance with one embodiment of the present invention will be described with reference to FIGS. 1 through 5.

In the drawings, arrows FR and UP respectively indicate forward and upward directions with respect to a vehicle.

As shown in FIG. 1, a floor surface 12 of a vehicle 10 is fitted with a passenger seat 14 through a pair of left and right rails (not shown) installed in parallel with a longitudinal direction of the vehicle. This enables the passenger seat 14 to move relative to the floor surface in the longitudinal direction. A windshield glass 16 is disposed above and in front of the passenger seat 14. The windshield glass 16 is connected at one end to a roof 17 and at the other end to a bonnet (not shown). An instrument panel 18 is installed in front of the passenger seat 14 between the floor surface 12 and the windshield glass 16. The instrument panel 18 is made of synthetic resin and has a generally U-shaped cross-section. The instrument panel 18 is disposed so that an opening of the U-shaped cross-section is directed forwardly with respect to the vehicle.

An air bag device 20 is disposed inside the instrument panel 18. An air bag casing 28 of the air bag device 20 has a generally U-shaped cross-section and is disposed so that an opening of the generally U-shaped cross-section is directed rearwardly and upwardly with respect to the vehicle. An inflator 30 is disposed in a bottom portion of the air bag casing 28, and an air bag body 31 is accommodated in its folded state in the vicinity of an opening of the air bag casing 28. Upon generation of gas by the inflator 30, the air bag body 31 expands and is deployed into a vehicle compartment from the opening of the instrument panel 18.

The inflator 30 in the air bag casing 28 is connected to an air bag device control circuit 32 including a microcomputer. A collision sensor 38 for detecting a deceleration acting on the vehicle at the time of collision is connected to the air bag device control circuit 32. A seated-state detection sensor 38 is disposed in a seat portion of a seat cushion 36 of the passenger seat 14.

Figure 2:
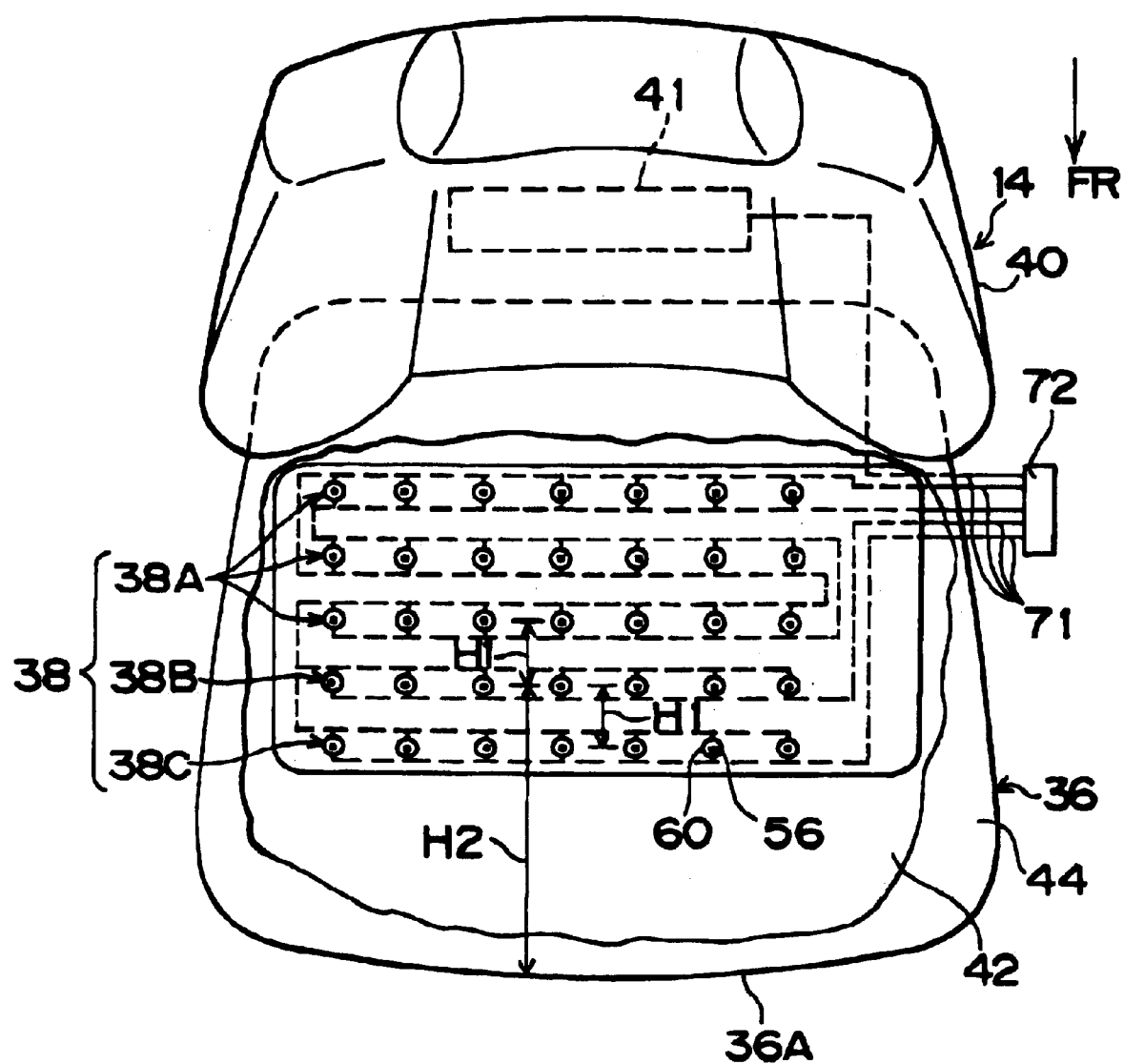
FIG. 2 is a plan view of a seat to which the seated-state detection sensor in accordance with one embodiment of the present invention is applied.

As shown in FIG. 2, the seated-state detection sensor 38 is disposed between a pad 42 and a skin 44 of the seat cushion 36. The seated-state detection sensor 38 is divided into three sensors, that is, a first seated-state detection sensor 38A, a second seated-state detection sensor 38B and a third seated-state detection sensor 38C, which are arranged in this order from the rear side of the vehicle. The first seated-state detection sensor 38A and the second seated-state detection sensor 38B are designed to detect the presence or absence of a seated passenger, that is, to determine whether or not there is a passenger seated. The second seated-state detection sensor 38B and the third seated-state detection sensor 38C are designed to detect forward displacement of a seated passenger. In this embodiment, the deceleration G of displacement of a child passenger generated by braking is estimated to range from 0.2 G to 1 G. The first seated-state detection sensor 38A, the second seated-state detection sensor 39B and the third seated-state detection sensor 38C are arranged at intervals of H1. To enable the air bag device to be deactivated upon detection of a child passenger seated in a front portion of the seat cushion 36 with his or her knees flexed, a detecting position of the second seated-state detection sensor 38B is set at a distance of H2=150 mm to 300 mm, preferably approximately 250 mm, from a front end 36A of the seat cushion 36.

As indicated by a solid line in FIG 1, when a passenger 46 is seated in a rear portion of the seat cushion 36 (a normal seated state), at least the first seated-state detection sensor 38A detects the passenger 46. One the other hand, in the case where the passenger 46 who is not restrained by a seat belt has been displaced forwardly (in the direction indicated by an arrow A in FIG. 1) due to sudden braking or the like at the time of collision and reached the front portion of the seat cushion 36 as indicated by an alternate long and two short dashes line in FIG. 1, a rump 46A of the passenger 46 moves above the first seated-state detection sensor 38A, the second seated-state detection sensor 38B and the third seated-state detection sensor 38C, and these sensors are sequentially switched from on to off. As shown in FIG. 2, the first seated-state detection sensor 38A, the second seated-state detection sensor 38B and the third seated-state detection sensor 38C are disposed along a width direction of the seat cushion 36. If the passenger 46 has been seated in the front portion of the seat cushion 36, the second seated-state detection sensor 38B and the third seated-state detection sensor 38C are turned on. The passenger 46 is shown in the size of a child in FIG. 1. However, even if the passenger 46 is an adult, the first seated-state detection sensor 38A, the second seated-state detection sensor 38B and the third seated-state detection sensor 38C are turned off and on as mentioned above.

Figure 3:
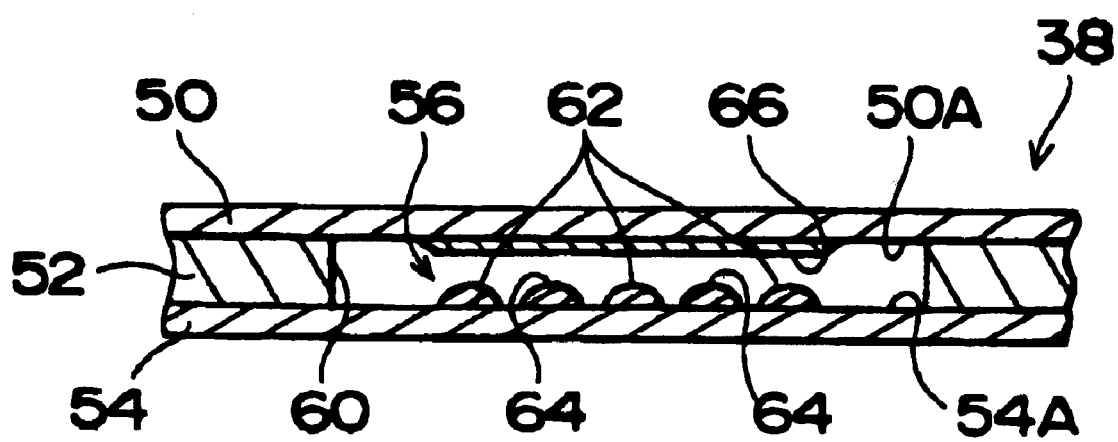
FIG. 3 is a sectional view taken along a line III—III in FIG. 4.

As shown in FIG. 3, the seated-state detection sensor 38 is a three-layer sheet film composed of an upper film 50, an intermediate film 52 and a lower film 54. A bore 60 is formed through the intermediate film 52.

In a section inside the bore 60, two pairs of thin conductive printed wires 62, 64 constituting a switch portion 56 are alternately arranged like a comb on an inner surface 54A of the lower film 54 facing the upper film 50. On the other hand, a conductive elastic body 66 made of conductive rubber or the like is disposed to face the two conductive printed wires, 62, 64 on an inner surface 50A of the upper film 50 facing the lower film 54.

Figure 4:
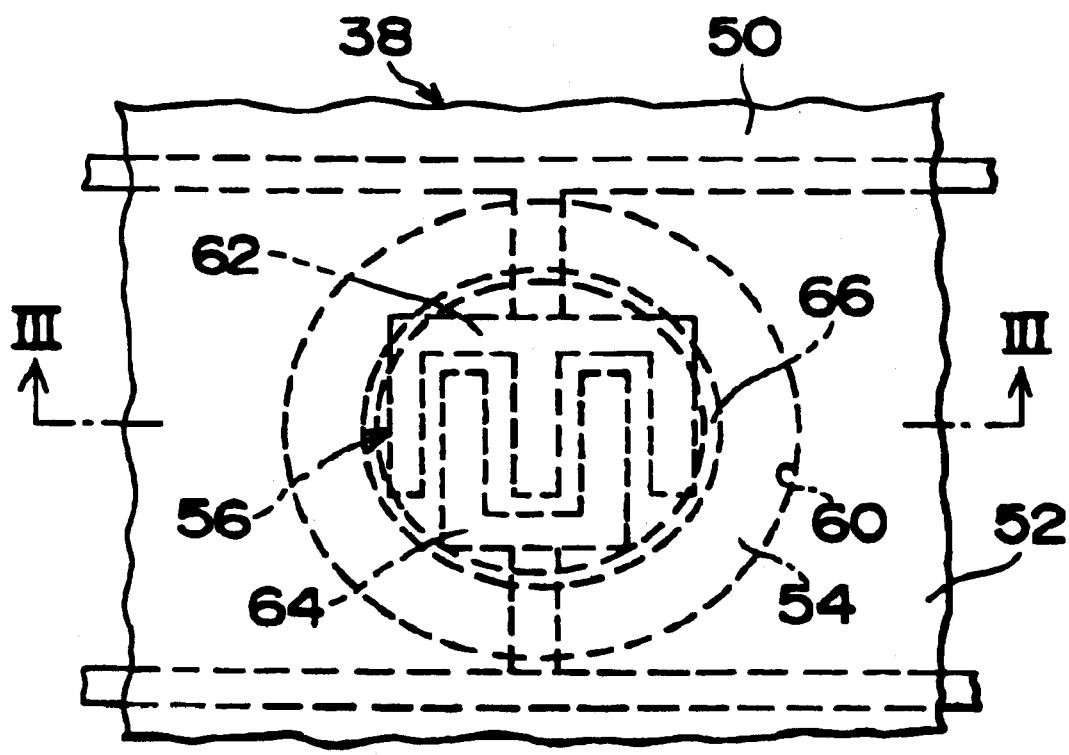
FIG. 4 is an enlarged plan view of a switch portion of the seated-state detection sensor in accordance with one embodiment of the present invention.

As shown in FIG. 4, the conductive elastic body 66 has a circular shape and is dimensioned to substantially cover the two pairs of thin comb-like conductive printed wires 62, 64. The intermediate film 52 serves to ensure a gap so that the conductive elastic body 66 does not usually contact the conductive printed wires 62, 64.

As shown in FIG. 2, the switch portion 56 of the seated-state detection sensor 38 is disposed along the width direction and the longitudinal direction of the seated-state detection sensor 38. In FIG. 2, the comb-like switch portion 56 is simply marked with a black dot. The size of the bore 60 in the intermediate film corresponds to the size of a circle.

The respective switch portions 56 of the first seated-state detection sensor 38A, the second seated-state detection sensor 38B and the third seated-state detection sensor 38C are connected to one another in parallel. If one of those switch portions 56 is turned on, it is determined that there is a passenger seated. Extension wires 71, which put together the first seated-state detection sensor 38A, the second seated-state detection sensor 38B and the third seated-state detection sensor 38C, lead to a connector 72. The connector 72 is designed to be connected to the air bag device control circuit 32 (see FIG. 1).

Next, the operation of this embodiment will be described in detail with reference to a flowchart shown in FIG. 5.

In this embodiment, as soon as a passenger inserts an ignition key into a key cylinder and the air bag device control circuit 32 and the like are supplied with electricity, it is checked whether or not there is a passenger on the seat 14. In checking the presence or absence of a passenger, the first seated-state detection sensor 38A and the second seated-state detection sensor 38B of the seated-state detection sensor 38 are used. If it is determined that there is a passenger seated, the air bag device 20 is made ready for activation in a step (hereinafter referred to as S) 100 in the flowchart, and it is determined whether or not the first seated-state detection sensor 38A is on. In S100, in order to prevent erroneous detection from being caused when the first seated-state detection sensor 38A and the second seated-state detection sensor 38B are switched from on to off due to a slight bodily displacement of the passenger, for example, in the case where the vehicle travels along a rough road, or from being caused by electric noise, on-signals from the first seated-state detection sensor 38A and the second seated-state detection sensor 38B continue to be outputted for a period (e.g., 300 ms to 1 s) more than twice as long as an on-to-off time lag (approximately 100 ms) of the sensors. In other words, if the off-state does not continue for a period twice as long as the time lag, it is determined that there is a passenger seated, and the air bag is kept ready for activation. In a state of S100 namely, when the air bag device is ready for activation, S102 and the following steps take priority of S100.

If it is determined in S102 that the first seated-state detection sensor 38A is on, that is, if the result in S102 is YES, the operation proceeds to S104. In S104, it is determined whether or not the second seated-state detection sensor 38B has been switched from on to off, for example, within 20 ms to 250 ms after the switching of the first seated-state detection sensor 38A from on to off while the third seated-state detection sensor 38C is on.

If it is determined in S104 that the second seated-state detection sensor 38B has been switched from on to off, for example, with 20 ms to 250 ms after the switching of the first seated-state detection sensor 38A from on to off while the third seated-state detection sensor 38C is on, that is, if the result in S104 is YES, the operation proceeds to S106. In S106, it is determined whether or not the third seated-state detection sensor 38C has been switched from on to off, for example, within 20 ms to 250 ms after the switching of the second seated-state detection sensor 38B from on to off, while the first seated-state detection sensor 38A is off.

If it is determined in S106 that the third seated-state detection sensor 38C has been switched from on to off, for example, within 20 ms to 250 ms after the switching of the second seated-state detection sensor 38B from on to off while the first seated-state detection sensor 38A is off, that is, if the result is S106 is YES, the operation proceeds to S108 where the air bag device 20 is deactivated.

One the other hand, if the result in S102 is NO, the operation proceeds to S110 where it is determined whether or not the second seated-state detection sensor 38B is on.

If it is determined in S110 that the second seated-state detection sensor 38B is on, that is, if the result in S110 is YES, the operation proceeds to S106. If the result in S110 is NO, the operation returns to the initial step.

If the result in S104 is NO and the result in S106 is NO, the operation returns to the initial step.

Thus, according to this embodiment, it is possible to detect whether or not there is a passenger seated by means of the rear portion of the seated-state detection sensor 38. The passenger 46 seated in the passenger seat 14 is displaced forwardly at the time of braking as a precaution against collision. In this embodiment, only if both on-to-off transition periods between the first seated-state detection sensor 38A and the second seated-state detection sensor 38B and between the second seated-state detection sensor 38B and the third seated-state detection sensor 38C are within a predetermined length of time, the air bag device 20 is controlled to be activated or deactivated. During forward displacement of the passenger 46, the first, second and third seated-state detection sensors 38A, 38B, 38C constitutes rear, intermediate and front portions of the seated-state detection sensor 38 respectively. Here, the on-to-off transition period between the first seated-state detection sensor 38A and the second seated-state detection sensor 38B is a period starting with the time when the first seated-state detection sensor 38A is switched from on to off and ending with the time the first seated-state detection sensor 38A is switched from on to off. The on-to-off transition period between the second seated-state detection sensor 38B and the third seated-state detection sensor 38C is a period starting with the time when the second seated-state detection sensor 38B is switched from on to off and ending with the time when the third seated-state detection sensor 38C is switched from on to off. In this embodiment, the predetermined length of time is set to 20 ms to 250 ms. If the on-to-off transition periods between the first seated-state detection sensor 38A and the second seated-state detection sensor 38B and between the second seated-state detection sensor 38B and the third seated-state detection sensor 38C are shorter than 20 ms, it is estimated, for example, that the passenger is displaced vertically when the vehicle travels along a rough road. Therefore, it is preferable not to prohibit the air bag device from being activated. If the on-to-off transition periods between the first seated-state detection sensor 38A and the second seated-state detection sensor 38B and between the second seated-state detection sensor 38B and the third seated-state detection sensor 38C are longer than 250 ms, it is estimated that the passenger 46 is displaced forwardly slower than at the time of braking as a precaution against collision, or that the passenger 46 is hardly displaced forwardly. In this case, it is estimated that the passenger has moved forwardly at his or her own will. Hence, the air bag is not prohibited from being activated. Thus, according to this embodiment, when the on-to-off transition periods between the first seated-state detection sensor 38A and the second seated-state detection sensor 38B and between the second seated-state detection sensor 38B and the third seated-state detection sensor 38C are in the range of 20 ms to 250 s, the air bag device is deactivated.

Thus, this embodiment makes it possible to precisely detect forward bodily displacement of the passenger 46 without being affected by movement of hands of the passenger 46. As a result, the passenger seat air bag device 20 can be activated at a suitable timing. Also, since forward displacement of the passenger 46 is judged based on two pieces of information obtained from the rear and front portions of the seated-state detection sensor 38, it is possible to avoid misjudgment and optimally control the air bag device.

In this embodiment, when the first seated-state detection sensor 38A is off and the second seated-state detection sensor 38B is on, it is predicated that the passenger 46 has been seated in the front portion of the seat cushion 36 from the very outset. The on-to-off transition period between the second seated-state detection sensor 38B and the third seated-state detection sensor 38C is measured, and it is determined whether or not the measured period is within a predetermined length of time. The air bag device 20 is then controlled to be activated or deactivated. Thus, even if the passenger 46 is seated in the front portion of the seat cushion 36, it is possible to detect forward bodily displacement of the passenger 46 with certainty and suitably control the air bag device.

In this embodiment, during a normal running state of the vehicle, the first seated-state detection sensor 38A and the second seated-state detection sensor 38B set the on-signal duration period which is more than twice as long as the off-to-on time lag. If at least one on-signal is detected within the on-signal duration period, the on-state is maintained. Therefore, it is possible to prevent erroneous detection from being caused when the first seated-state detection sensor 38A and the second seated-state detection sensor 38B are switched from on to off due to a slight bodily displacement of a passenger, for example, in the case where the vehicle travels along a rough road, or from being caused by electric noise.

In this embodiment, the detection margin of the second seated-state sensor 38B is set to a position at a distance of 150 mm to 300 mm from the front end of the seat cushion 36. Therefore, even if the passenger 46 is seated in the front portion of the seat cushion 36 with his or her knees flexed, this state can be detected. Consequently the air bag device 20 can be deactivated even in this case.

It is also possible to employ a construction wherein a seat back sensor is combined with this embodiment. To be more specific, as shown in FIG. 1, a seat back sensor 41 designed as a capacitance type sensor or the like is disposed in a passenger-abutment portion of a seat back 40 of the passenger seat 14. The seat back sensor 41 leads to the connector 72 and detects a state where a passenger adjoins the seat back 40.

Figure 5:
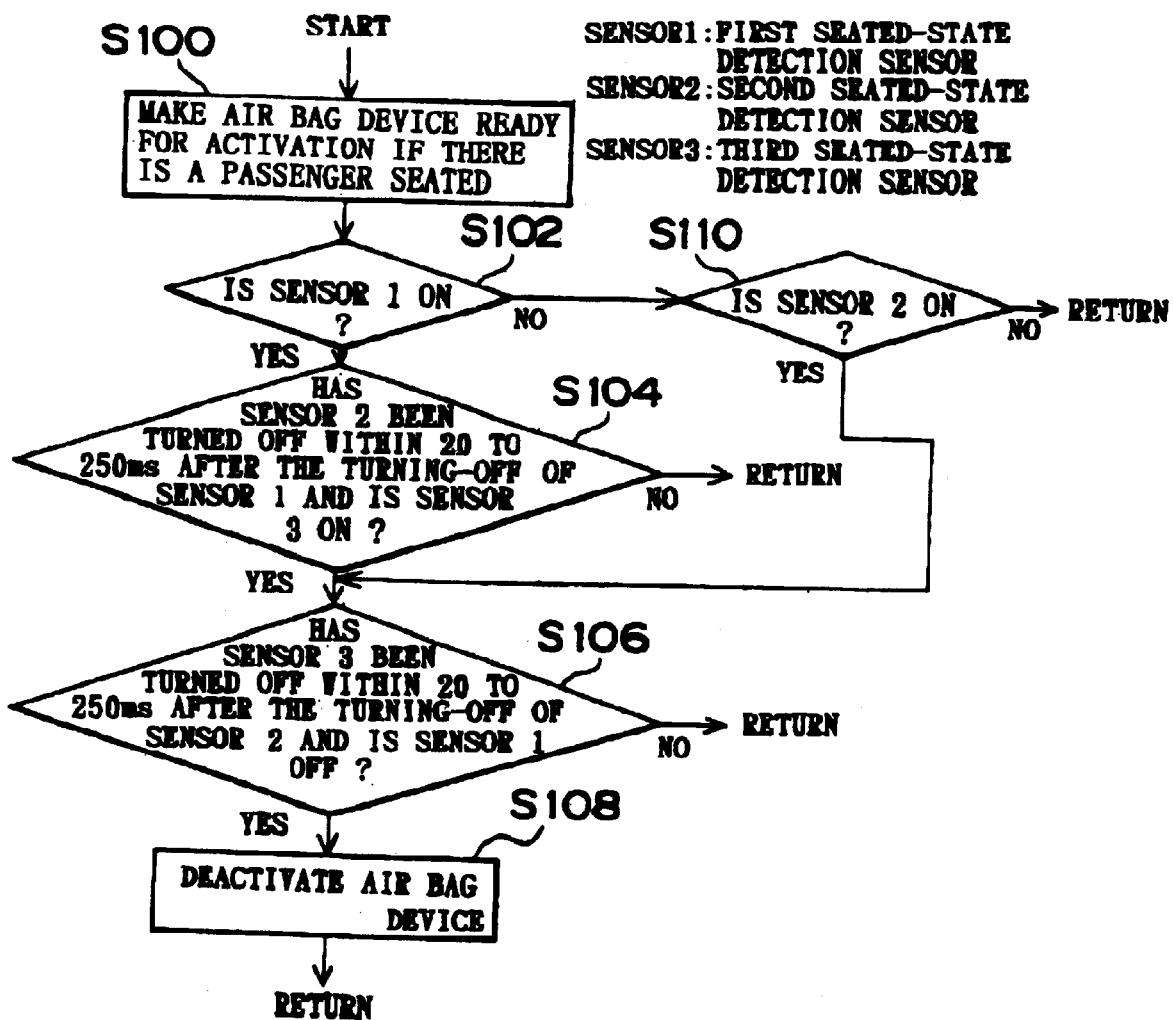
FIG. 5 is a flowchart of the control system for the passenger seat air bag device employing the seated-state detection sensor in accordance with one embodiment of the present invention.

In this construction, as indicated by a flow chart in FIG. 6 which has S112 in addition to the flowchart in FIG. 5, the air bag device control circuit 32 determines in S112 following S100 whether or not the upper part of a passenger is in the rear portion of the seat, based on a detection signal of the seat back sensor 41. If it is determined that the upper part of the passenger is in the rear portion of the seat, the upper part of the passenger is sufficiently distanced from the air bag device 20. Hence, it is determined that there is no need to deactivate the air bag device 20, and the operation returns to the initial step. On the other hand, if it is determined in S112 that the upper part of the passenger is not in the rear portion of the seat, the same control as in S102 and the following steps of the aforementioned embodiment is performed.

Although the present invention has been described in detail referring to a specific embodiment thereof, it is obvious to those skilled in the art that the present invention is not limited to the embodiment, and that various embodiments can be realized within the scope of the present invention.

What is claimed is:

1. A passenger seat air bag device control system comprising:
   a seated-state detection sensor, disposed in a seat cushion and divided into a plurality of parts in a longitudinal direction of a vehicle, including a seated-state detecting portion for detecting whether or not there is a passenger seated and a displacement detecting portion for detecting forward displacement of the passenger; and
   a control unit that receives signals from the sensor, calculates the displacement speed of the passenger, and controls the passenger seat air bag device based on the seated-state of the passenger and the speed of forward displacement of the passenger.

2. The passenger seat air bag device control system according to claim 1, wherein:
   an interval between on-to-off transition timings of a front and a rear displacement detecting portions of the seated-state detection sensor is measured; and
   if the measured interval is in a predetermined time range, it is judged that the passenger has been displaced forwardly, and activation or deactivation of the air bag device or an output level of an inflator is controlled.

3. The passenger seat air bag device control system according to claim 2, wherein:
   the predetermined time range is a range of time required for the passenger to be displaced forwardly at the time of braking as a precaution against collision.

4. The passenger seat air bag device control system according to claim 3, wherein:
   the predetermined time range ranges from 20 ms to 250 ms.

5. The passenger seat air bag device control system according to claim 1, wherein:
   the seated-state detecting portion is a rear portion of a plurality of divided parts of the seated-state detection sensor; and
   the displacement detecting portion is a front portion of a plurality of divided parts of the seated-state detection sensor.

6. The passenger seat air bag device control system according to claim 1, wherein:
   the displacement detecting portion is composed of front and rear portions of the divided parts of the seated-state detection sensor.

7. The passenger seat air bag device control system according to claim 6, wherein:
   on-to-off transition timings of the rear and front portions of the seated-state detection sensor are measured; and
   if an interval between the measured timings is in a predetermined time range, it is judged that the passenger has been displaced forwardly, and activation or deactivation of the air bag device or an output level of an inflator is controlled.

8. The passenger seat air bag device control system according to claim 7, wherein:
   the predetermined time range ranges from 20 ms to 250 ms.

9. The passenger seat air bag device control system according to claim 1, wherein:
   an interval between on-to-off transition timings of a first seated-state detection sensor constituting a rear portion of the seated-state detection sensor and a second seated-state detection sensor constituting an intermediate portion of the seated-state detection sensor and an interval between on-to-off transition timings of the second seated-state detection sensor and a third seated-state detection sensor constituting a front portion of the seated-state detection sensor are measured; and
   only if both the intervals are in a predetermined time range, the air bag device is controlled to be deactivated.

10. The passenger seat air bag device control system according to claim 9, wherein:
    the predetermined time range ranges from 20 ms to 250 ms.

11. The passenger seat air bag device control system according to claim 1, wherein:
    when a first seated-state detection sensor constituting a rear portion of the seated-state detection sensor is off and a second seated-state detection sensor constituting an intermediate portion of the seated-state detection sensor is on, it is predicated that the passenger has been seated in a front side of a vehicle seat from the very outset, and an interval between on-to-off transition timings of the second seated-state detection sensor and a third seated-state detection sensor constituting a front portion of the seated-state detection sensor is measured, and it is determined whether or not the measured period is within a predetermined length of time, and then the air bag device is controlled to be deactivated.

12. The passenger seat air bag device control system according to claim 11, wherein:
    a detecting position of the second seated-state detection sensor corresponds to a position of a rump of a child passenger who is seated in a front portion of the seat cushion with his or her knees flexed.

13. The passenger seat air bag device control system according to claim 12, wherein:
    a detecting position of the second seated-state detection sensor is set to a position at a distance of 150 mm to 300 mm from a front end of the seat cushion.

14. The passenger seat air bag device control system according to claim 1, wherein:
    a rear portion of the seated-state detection sensor sets an on-signal duration period which is at least more than twice as long as an off-to-on time lag; and
    if at least one on-signal is detected within the on-signal duration period, it is determined that there is a passenger seated.

15. The passenger seat air bag device control system according to claim 1, further comprising:

a seat back sensor which is disposed in a seat back and detects whether or not an upper part of a passenger is located in a rear portion of the seat, wherein:

if the seat back sensor detects that the upper part of the passenger is located in the rear portion of the seat, the air bag device is controlled to be ready for activation.

16. A passenger seat air bag device control system comprising:

a seated-state detection sensor, disposed in a seat cushion, for detecting whether or not there is a passenger seated, the seated-state sensor having a displacement detecting portion, divided into a plurality of parts in a longitudinal direction of a vehicle, for detecting forward displacement of the passenger; and a control unit that receives signals from the sensor, calculates the displacement speed of the passenger, and controls the passenger seat air bag device based on the seated-state of the passenger and the speed of forward displacement of the passenger.

* * * * *